(12) United States Patent
Kobayashi et al.

(10) Patent No.: US 7,427,098 B2
(45) Date of Patent: Sep. 23, 2008

(54) REAR VEHICLE BODY STRUCTURE

(75) Inventors: Akira Kobayashi, Hamamatsu (JP); Takanori Tsukakoshi, Hamamatsu (JP)

(73) Assignee: Suzuki Motor Corporation (JP)

( * ) Notice: Subject to any disclaimer, the term of this patent is extended or adjusted under 35 U.S.C. 154(b) by 281 days.

(21) Appl. No.: 11/228,576

(22) Filed: Sep. 16, 2005

(65) Prior Publication Data
US 2006/0061142 A1 Mar. 23, 2006

(30) Foreign Application Priority Data
Sep. 17, 2004 (JP) ............... 2004-270905

(51) Int. Cl.
*B62D 21/02* (2006.01)
(52) U.S. Cl. ............... 296/203.04
(58) Field of Classification Search ............ 296/203.04, 296/203.01, 204, 193.08; 180/311
See application file for complete search history.

(56) References Cited

U.S. PATENT DOCUMENTS

| | | | |
|---|---|---|---|
| 2,389,907 A * | 11/1945 | Helmuth | 296/203.01 |
| 5,267,772 A | 12/1993 | Ohta et al. | |
| 5,350,214 A | 9/1994 | Yamauchi et al. | |
| 7,021,703 B2 * | 4/2006 | Yamaguchi et al. | 296/203.04 |
| 7,032,961 B2 * | 4/2006 | Matsuda | 296/204 |
| 2006/0061142 A1 * | 3/2006 | Kobayashi et al. | 296/203.04 |
| 2006/0087156 A1 * | 4/2006 | Kobayashi et al. | 296/203.01 |
| 2006/0197300 A1 * | 9/2006 | Nakashima et al. | 280/124.109 |
| 2007/0114815 A1 * | 5/2007 | Egawa et al. | 296/203.04 |

FOREIGN PATENT DOCUMENTS

| | | |
|---|---|---|
| DE | 40 20 363 C2 | 1/1992 |
| JP | 07-117726 A | 5/1995 |
| JP | 07-300081 A | 11/1995 |
| JP | 08-282532 A | 10/1996 |
| KR | 950014417 B | 11/1995 |
| KR | 960005860 B | 5/1996 |

OTHER PUBLICATIONS

Office Action dated Jan. 29, 2008, in connection with corresponding Indian Patent Application No. 1303/CHE/2005.

* cited by examiner

*Primary Examiner*—H Gutman
(74) *Attorney, Agent, or Firm*—Lerner, David, Littenberg, Krumholz & Mentlik, LLP

(57) ABSTRACT

It is an object of the present invention to increase the rigidity of a seat surface portion, to which a seat for a suspension spring is attached, of a rear side member in a vehicle body rear part. The present invention is characterized by a rear vehicle body structure in which at least intermediate portions of a pair of right and left rear side members are connected to each other by a cross member, and the seat surface portion for the suspension spring is provided on the rear side member, wherein a reinforcing panel for connecting the rear side member to the cross member is provided in a connecting portion between the rear side member and the cross member; the rear end position of the reinforcing panel is set at a substantially middle position between the connecting portion between the rear side member and the cross member and the rear end of the rear side member; and the seat surface portion for the suspension spring is set at a substantially middle position between the connecting portion between the rear side member and the cross member and the rear end of the reinforcing panel.

4 Claims, 6 Drawing Sheets

REAR VEHICLE BODY STRUCTURE

FIELD OF THE INVENTION AND RELATED ART STATEMENT

The present invention relates to a rear vehicle body structure capable of increasing the rigidity of a seat surface portion, to which a seat for a suspension spring is attached, of a rear side member in a vehicle body rear part.

Conventionally, on the rear side of a vehicle body, a pair of right and left rear side members for supporting the lower surface side of a rear floor panel, and a member for connecting these rear side members to each other and a cross member are provided. A portion in which the rear side member and the cross member are connected to each other requires a sufficient connecting rigidity to greatly contribute to the rigidity of the vehicle body.

On the other hand, in the case where a load from the rear is absorbed, if there is an extreme difference in rigidity of side member depending on places, namely, locally, there arises a problem in that the absorption of load in the side member does not proceed uniformly. Therefore, it is desirable that the rigidity of side member change gradually.

Also, in the case of a suspension type in which a spring seat is provided on the side member, in order to receive the load of spring, it is necessary to sufficiently increase the rigidity of side member near a seat surface on which the spring seat is attached.

However, in this case as well, since there is produced a difference in rigidity of side member depending on places, the rigidity cannot be increased in simple way.

As measures to connect members to each other, provision of a reinforcing panel of a shape such that a corner portion is spread has conventionally been known (Japanese Patent Provisional Publication No. 1995-300081, Japanese Patent Provisional Publication No. 1996-282532, Japanese Patent Provisional Publication No. 1995-117726). By this configuration, stress concentration in the connecting portion is relaxed, and hence the connecting rigidity is increased.

However, with the conventional method, in solving a problem of receiving a spring load, uniform absorption of load cannot be performed. Also, if local reinforcement is accomplished to receive the spring load, there arises a problem in that uniform absorption of load cannot further be performed. Also, if the rigidity of side member is different in front and rear of the seat surface portion to which the spring seat is attached, the seat surface portion or the spring seat is tilted when a load is applied. Therefore, it is desirable that the rigidity of side member be the same in front and rear of the spring seat surface portion.

In order to provide rigidity in the connecting portion by gradually increasing the rigidity from the rear end of side member to the connecting portion, a gradual increase in cross-sectional area could be considered. However, a part in which the cross-sectional area changes gradually is difficult to press, and also difficult to assemble and connect, resulting in decreased productivity and higher cost.

OBJECT AND SUMMARY OF THE INVENTION

The present invention has been made to solve the above problems, and accordingly an object thereof is to provide a rear vehicle body structure capable of increasing the rigidity of a seat surface portion, to which a seat for a suspension spring is attached, of a rear side member in a vehicle body rear part.

To achieve the above object, the present invention provides a rear vehicle body structure in which at least intermediate portions of a pair of right and left rear side members are connected to each other by a cross member, and a seat surface portion for a suspension spring is provided on the rear side member, wherein a reinforcing panel for connecting the rear side member to the cross member is provided in a connecting portion between the rear side member and the cross member; the rear end position of the reinforcing panel is set at a substantially middle position between the connecting portion between the rear side member and the cross member and the rear end of the rear side member; and the seat surface portion for the suspension spring is set at a substantially middle position between the connecting portion between the rear side member and the cross member and the rear end of the reinforcing panel.

Also, in the present invention, the whole shape of the reinforcing panel is a substantially T shape; each of the connecting portions is formed so as to have a substantially U-shaped transverse cross section; and the reinforcing panel is joined so as to cover the connecting portion between the rear side member and the cross member.

According to the rear vehicle body structure in accordance with the present invention, a uniform load is absorbed efficiently by the rear side member, and the load of the spring is received efficiently.

DETAILED DESCRIPTION OF PREFERRED EMBODIMENTS

An embodiment of the present invention will now be described in detail with reference to the accompanying drawings.

Figure 1:
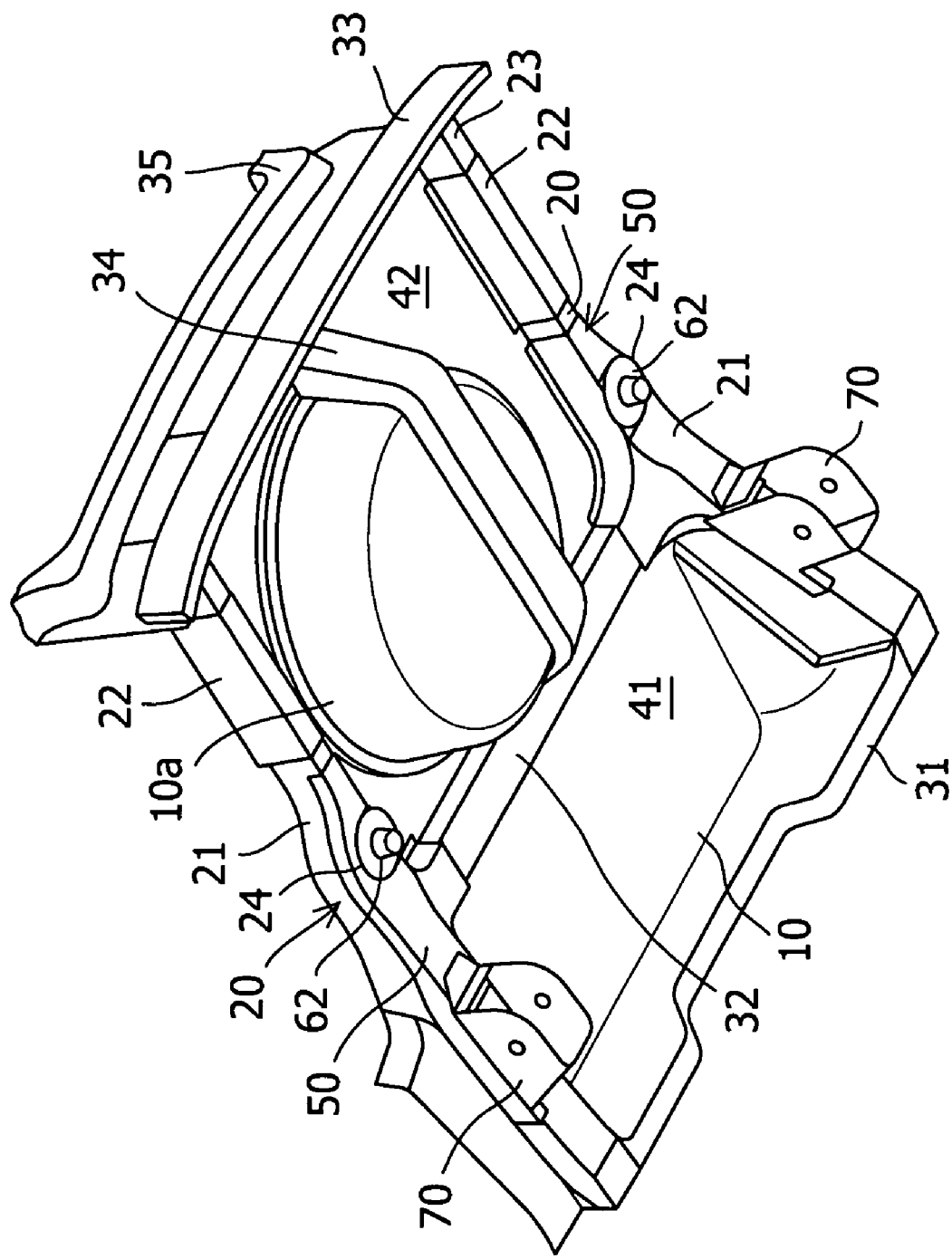
FIG. 1 is a perspective view of a rear vehicle body in accordance with an embodiment of a rear vehicle body structure of the present invention, viewed from the downside in the rear of a vehicle body.
Figure 2:
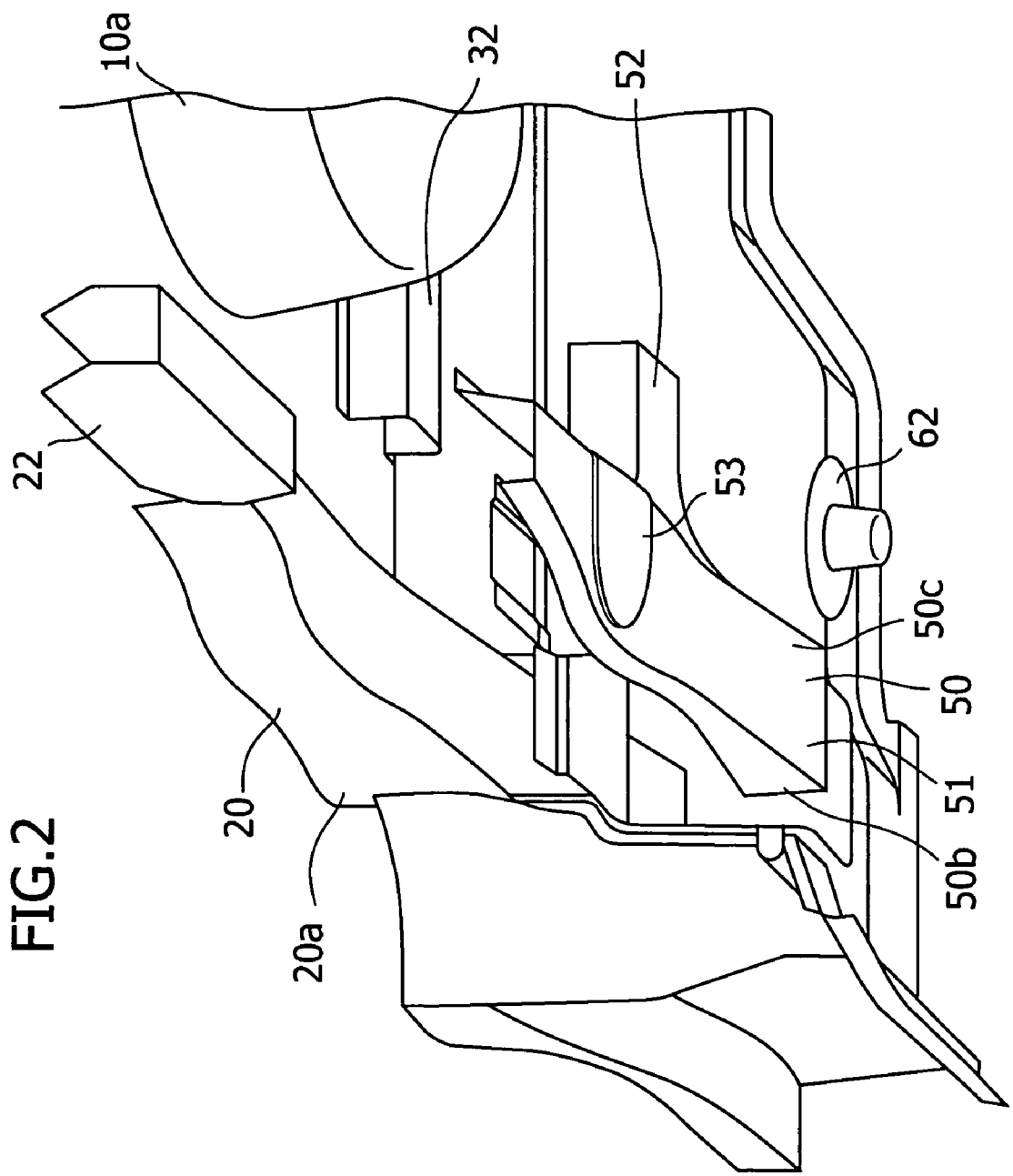
FIG. 2 is a broken perspective view enlargedly showing a portion shown in FIG. 1.
Figure 3:
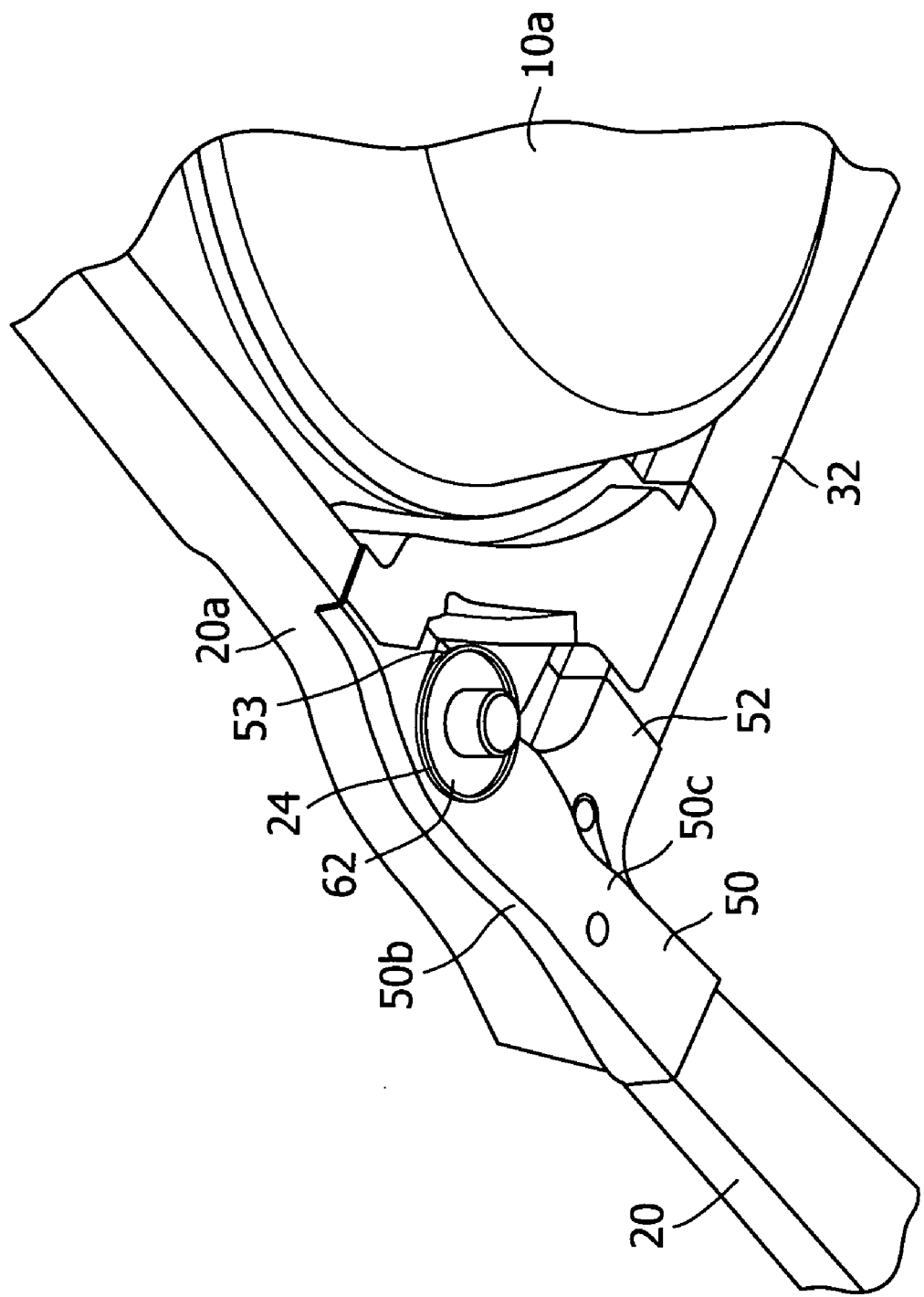
FIG. 3 is a perspective view enlargedly showing a portion shown in FIG. 1.
Figure 4:
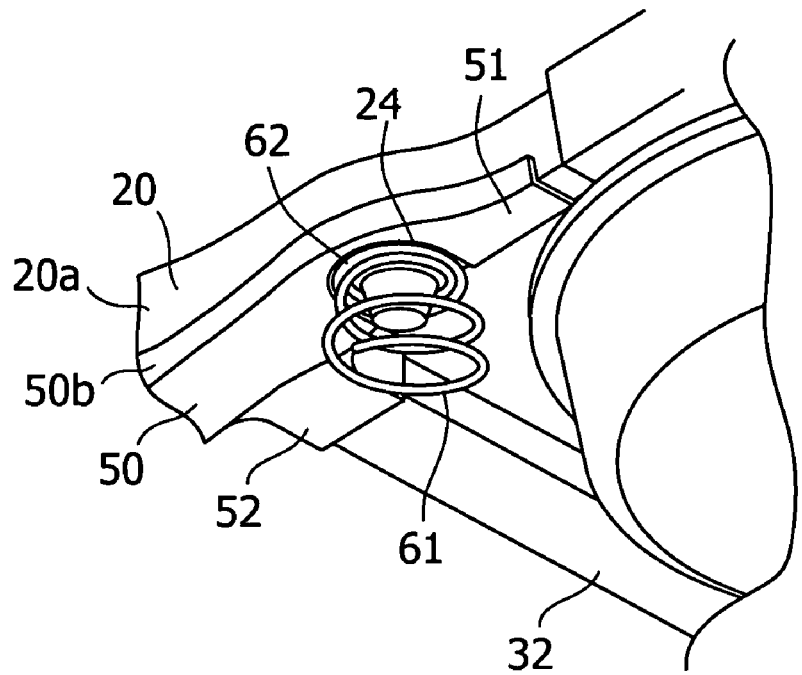
FIG. 4 is a partially enlarged view of FIG. 1, showing a state in which a suspension spring is attached.
Figure 5:
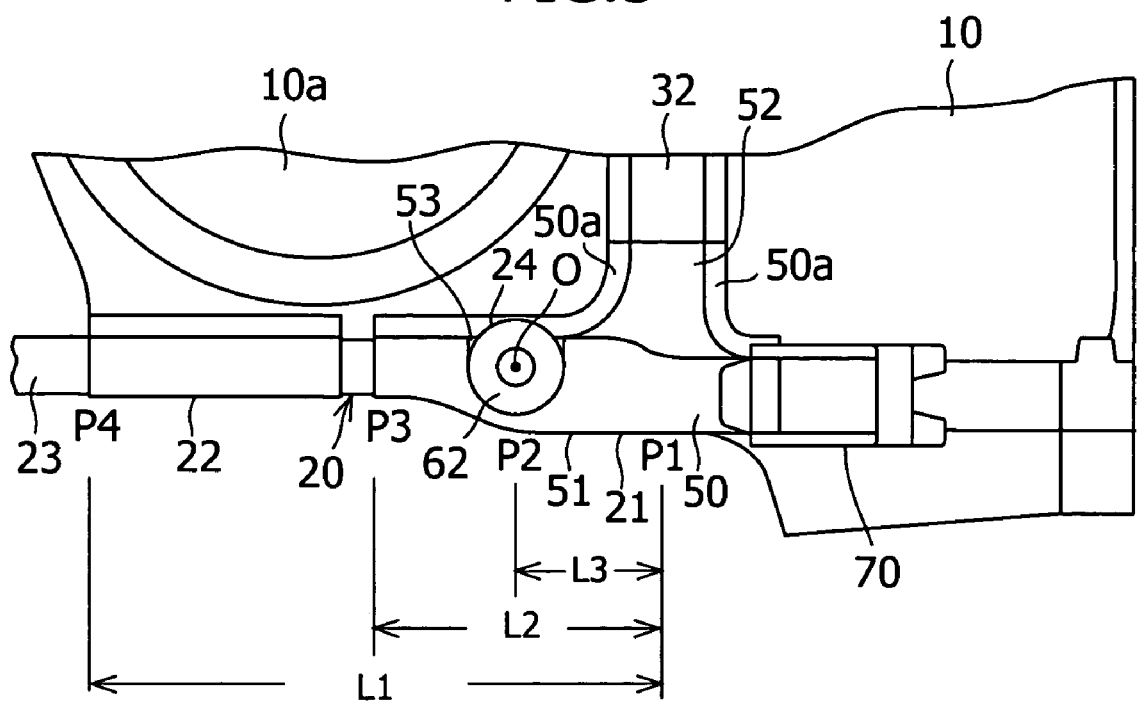
FIG. 5 is a bottom view of FIG. 1, showing a rear vehicle body in accordance with an embodiment of a rear vehicle body structure of the present invention.
Figure 6:
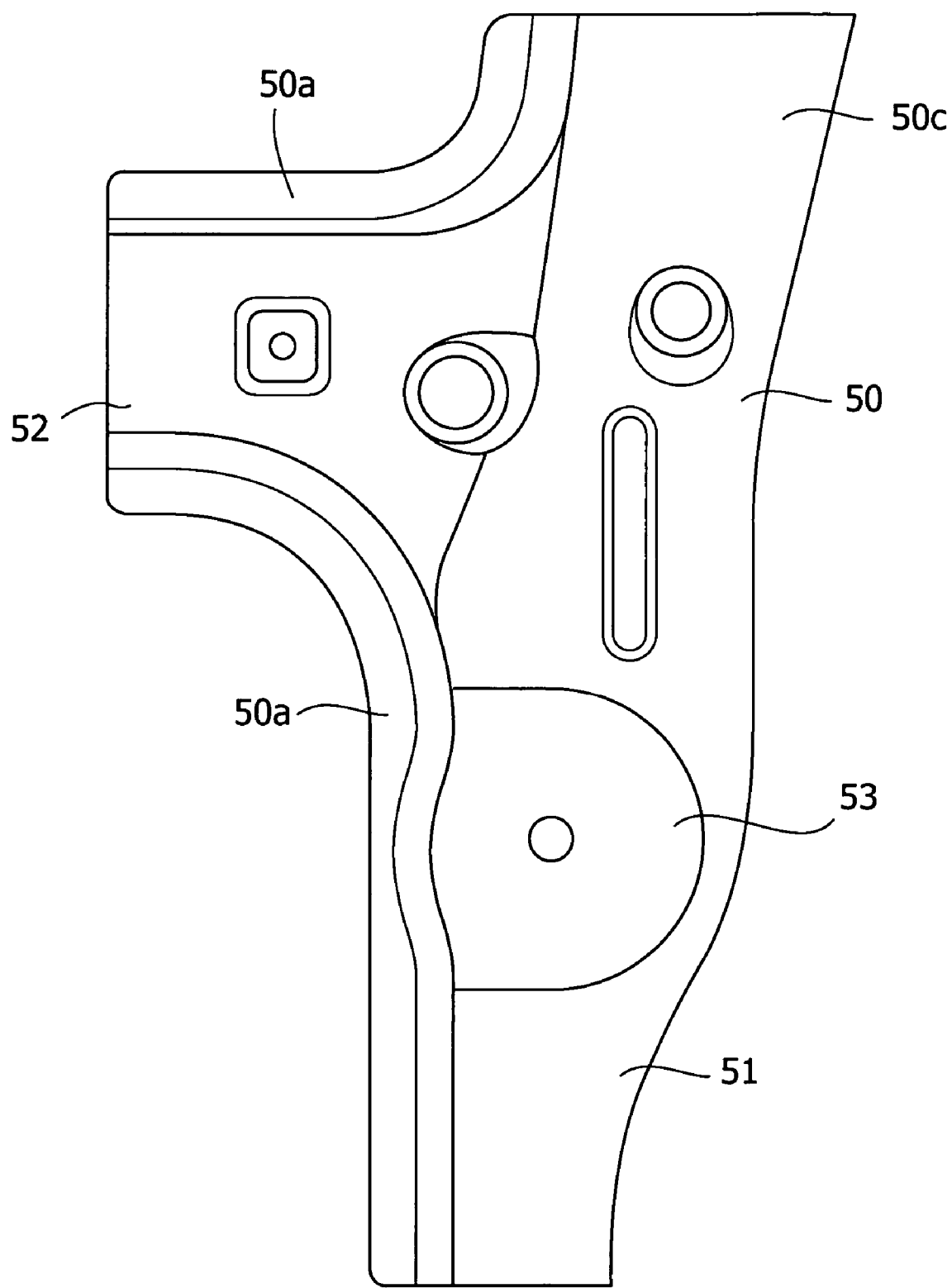
FIG. 6 is a bottom view of a reinforcing panel shown in FIG. 1.
Figure 7:
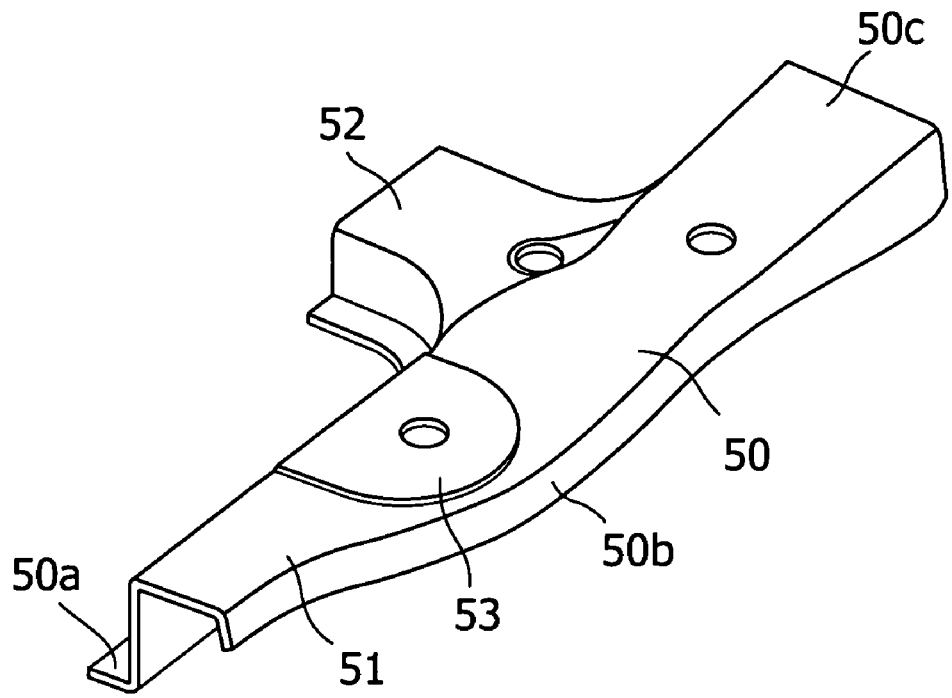
FIG. 7 is a perspective view of a reinforcing panel shown in FIG. 1.

FIG. 1 is a perspective view of a rear vehicle body, viewed from the downside in the rear of a vehicle body, FIG. 2 is a partially enlarged broken perspective view of FIG. 1, FIG. 3 is a partially enlarged perspective view of FIG. 1, FIG. 4 is a perspective view showing a seat surface portion of a suspension spring shown in FIG. 1, FIG. 5 is a bottom view showing a rear vehicle body structure shown in FIG. 3, FIG. 6 is a bottom view enlargedly showing a reinforcing panel shown in FIG. 5, and FIG. 7 is a perspective view of the reinforcing panel shown in FIG. 6.

In FIGS. 1 to 3, reference numeral 10 denotes a rear floor panel forming a floor of a rear vehicle body, and on the rear side thereof, a spare tire housing 10a for housing a spare tire is provided. Reference numeral 20 denotes a pair of right and left rear side members disposed in the vehicle body longitudinal direction by being installed on the lower surface side on both sides of the rear floor panel 10 by spot welding or the like. These rear side members 20 each are formed into a long frame by pressing a flat shaped panel into a U shape. Between front end portions of the rear side members 20, a member 31 is joined, and between intermediate portions thereof, a cross member 32 is joined. Also, between the rear end portions thereof, a bumper beam 33 is joined. Above the bumper beam 33, a back panel 35 is provided. By the right and left rear side members 20, the member 31, the cross member 32, and the back panel 35, two sets of frames 41 and 42 are formed to reinforce the lower surface of the rear floor panel 10. The spare tire house 10a in the rear floor panel 10 is arranged within the rear side frame 42 formed by the cross member 32, the back panel 35, and the rear side members 20 and is reinforced by these members. On the lower surface side of the spare tire house 10a, a reinforcing member 34, which is set between the cross member 32 and the back panel 35, is disposed in the vehicle body longitudinal direction.

In the connecting portion between the cross member 32 and the rear side member 20 in the intermediate portion, a reinforcing panel 50 is mounted to connect the cross member 32 to the rear side member 20.

The whole shape of the reinforcing panel 50 is a substantially T shape, and each of the connecting portions 51 and 52 of the panel 50 with the cross member 32 and the rear side member 20 is formed so as to have a substantially U-shaped transverse cross section matching the cross member 32 and the rear side member 20. The reinforcing panel 50 is assembled to the rear side member 20 and the cross member 32 so as to cover the connecting portion 51, 52 from the downside, and is joined to the rear side member 20 and the cross member 32 by spot welding or the like.

The reinforcing panel 50 is provided with a flange portion 50a over a range from the connecting portion 52 with the cross member 32 to the connecting portion 51 with the rear side member 20, and is joined to the lower surface of the rear floor panel 10 via the flange portion 50a by spot welding or the like (refer to FIGS. 5 and 6). The reinforcing panel 50 joins a wall surface 50b facing to the vehicle body outside to an outside side wall 20a of the rear side member 20.

The rear side member 20 is constructed so that a large curvedly shaped portion 21 forming a principal portion of the rear side member 20 is joined to a linearly shaped portion 22 on the rear end side by spot welding or the like, and these portions 21 and 22 each have a substantially U-shaped transverse cross section. To the rear end of the linearly shaped portion 22, a connecting bracket 23 is joined, and the bumper beam 33 is assembled to the connecting bracket 23.

The reinforcing panel 50 is assembled to the curvedly shaped portion 21. As shown in FIG. 5, a rear end P3 of the reinforcing panel 50 is set at a position of L2, which is about a half of a length L1 from a connecting portion P1 of the rear side member 20 with the cross member 32 in the intermediate portion to a rear end position P4 of the rear side member 20, namely, at a middle position. Also, the center O of a seat surface portion 24 to which a seat 62 for a suspension spring 61 is attached is provided at a position P2 at a length L3, which is a half of the length L2 from the connecting portion P1 of the rear side member 20 with the cross member 32 to the rear end P3 of the reinforcing panel 50 (refer to FIG. 4). The reinforcing panel 50 is provided so that the relationship of the above-described positions is such that $$L1=2\times L2, \text{ and } L2=2\times L3.$$

On a bottom surface 50c of the reinforcing panel 50, a seat surface 53 is provided at a position corresponding to the seat surface portion 24.

Reference numeral 70 denotes a suspension bracket mounted in the front end portion of the rear side member 20. This suspension bracket 70 is formed into a U shape to support a suspension arm.

Next, the operation of the above-described rear vehicle body structure is explained.

Figure 8:
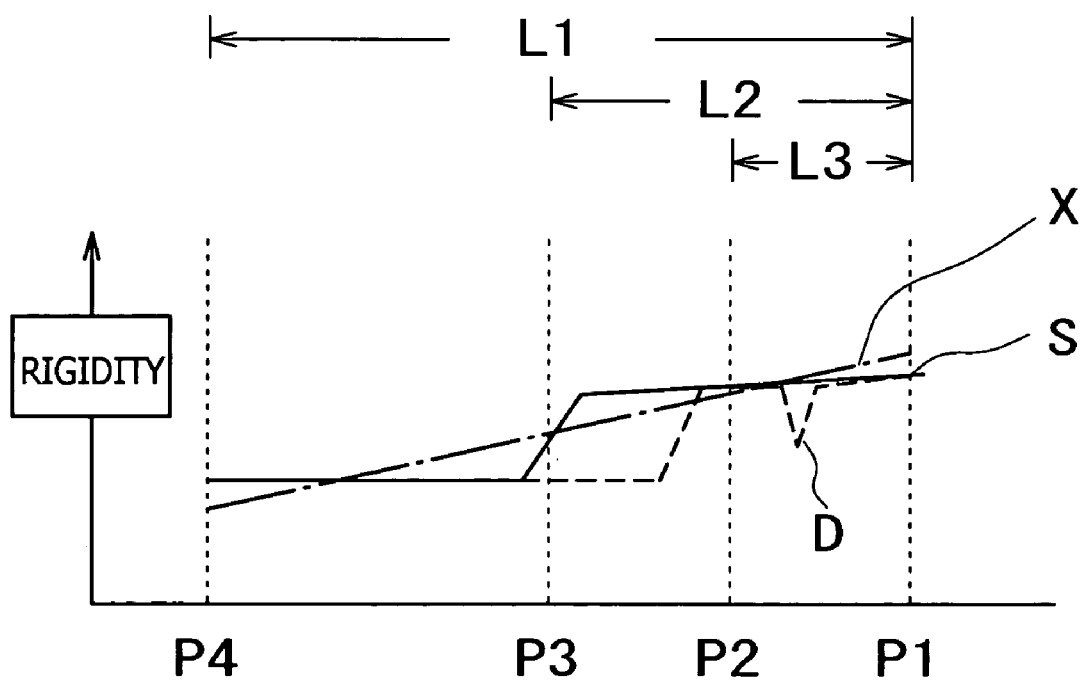
FIG. 8 is a graph showing strength distribution at positions of a rear side member in comparison with conventional distribution.

As indicated by a solid line S in FIG. 8, the positions of the rear side member 20 are expressed by P1 to P4, and the lengths to the positions are set at L1, L2 and L3. Thereby, the rigidity is increased in a portion in which the reinforcing panel 50 is disposed, and moreover, a difference in rigidity is not produced between the front and rear of the seat surface portion 24 to which the seat 62 is attached, so that the spring load can be received efficiently. A broken line in FIG. 8 indicates rigidity distribution in the case where the reinforcing panel is provided at the conventional position P1. A line X indicates the case where the rigidity is increased gradually.

As shown in FIG. 5, according to the above-described embodiment, the reinforcing panel 50 for connecting the rear side member 20 to the cross member 32 was provided in the connecting portion P1 of the rear side member 20 with the cross member 32, the rear end position P3 of the reinforcing panel 50 was set at the substantially middle position L2 between the connecting portion P1 and the rear end P4 of the rear side member 20, and the seat surface portion 24 to which the suspension spring seat 62 is attached was set at the substantially middle position P2 between the connecting portion P1 and the rear end P3 of the reinforcing panel 50. As a result, the rigidity of the rear side member 20 is increased by the reinforcing panel 50, and the strengths on both sides of the seat surface portion 24 to which the seat 62 for the suspension spring 61 is attached can be made uniform. Therefore, the load can be absorbed efficiently, and also the load applied to the spring 61 can be received with high efficiency. In particular, since the strengths on both sides of the seat surface portion 24 to which the seat 62 for the suspension spring 61 is attached are increased uniformly, the load can be absorbed continuously and wholly as compared with the conventional construction in which the strength is increased partially. Also, since the whole shape of the reinforcing panel 50 is in a substantially T shape, each of connecting portions is formed so as to have a substantially U-shaped transverse cross section, and the reinforcing panel 50 is joined so as to cover the connecting portion P1 between the rear side member 20 and the cross member 32, the rigidity of the connecting portion P1 can be increased.

The present invention is not limited to the above-described embodiment only. For example, although the rear side member 20 is formed by joining the curvedly shaped portion 21 to the linearly shaped portion 22 on the rear end side by spot welding or the like in this embodiment, the rear side member 20 can be formed by one integrally formed frame. Also, the shape of the reinforcing panel 50 is not subject to any special restriction, and it can be used by changing its shape arbitrarily according to the rear side member 20 and the cross member 32. In addition, it is a matter of course that the present invention can be carried out by being changed appropriately without departing from the spirit and scope of the present invention.

The invention claimed is:

1. A rear vehicle body structure, comprising:

a first and second rear side members having a front end and a rear end;

a cross member for connecting the first and second rear side members at a connecting location; and a reinforcing panel connecting the first and second rear side members to the cross member at the connecting location, the reinforcing panel including a rear end position set at a substantially middle position between the connecting location and the rear end of the first and second rear side members and a seat surface portion for a suspension spring set at a substantially middle position between the connecting location and the rear end of the reinforcing panel.

2. The rear vehicle body structure of claim 1, wherein the reinforcing panel has a substantially T shape.

3. The rear vehicle body structure of claim 1, wherein the connecting location has a substantially U shaped transverse cross section.

4. The rear vehicle body structure of claim 1, wherein the reinforcing panel substantially covers the connecting location.

* * * * *